United States Patent
Lee et al.

(10) Patent No.: US 11,556,189 B1
(45) Date of Patent: Jan. 17, 2023

(54) TOUCHPAD MODULE AND COMPUTING DEVICE USING SAME

(71) Applicant: Primax Electronics Ltd., Taipei (TW)

(72) Inventors: Chia-Feng Lee, Taipei (TW); Kai-Wen Cheng, Taipei (TW); Chang-Tse Lee, Taipei (TW); Guan-Hao Su, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/510,705

(22) Filed: Oct. 26, 2021

(30) Foreign Application Priority Data

Sep. 8, 2021 (TW) .................................. 110133383

(51) Int. Cl.
*G06F 3/0354* (2013.01)
*G06F 3/01* (2006.01)
*H02N 2/00* (2006.01)

(52) U.S. Cl.
CPC .......... *G06F 3/03547* (2013.01); *G06F 3/016* (2013.01); *H02N 2/001* (2013.01)

(58) Field of Classification Search
CPC ...... G06F 3/03547; G06F 3/016; G06F 1/169; G06F 1/1616; G06F 3/02; H02N 2/001
See application file for complete search history.

(56) References Cited

U.S. PATENT DOCUMENTS

| | | | | |
|---|---|---|---|---|
| 2012/0038562 | A1* | 2/2012 | Holman, IV | G06F 3/016 345/173 |
| 2012/0040721 | A1* | 2/2012 | Infanti | G06F 3/016 345/173 |
| 2017/0153703 | A1* | 6/2017 | Yun | G06F 3/016 |

* cited by examiner

*Primary Examiner* — Rodney Amadiz
(74) *Attorney, Agent, or Firm* — Kirton McConkie; Evan R. Witt

(57) ABSTRACT

A touchpad module includes a touch member, a bracket, a piezoelectric vibration unit and an elastic element. The bracket is located under the touch member. A portion of the touch member is exposed to a first perforation of the bracket. The piezoelectric vibration unit is aligned with the first perforation of the bracket. The piezoelectric vibration unit has a first surface and a second surface, which are opposed to each other. The elastic element installed on the bracket and contacted with the second surface of the piezoelectric vibration unit. When the piezoelectric vibration unit vibrates, a first reaction force is generated between the first surface of the piezoelectric vibration unit and the portion of the touch member exposed to the first perforation, and a second reaction force is generated between the second surface of the piezoelectric vibration unit and the elastic element.

14 Claims, 9 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad module is used as an input device of the electronic device for controlling the operations of the electronic device.

The touchpad module is usually installed on a casing of a notebook computer. Moreover, at least a part of the touchpad module is exposed outside the casing. Consequently, the touchpad module can be touched and operated by the user. For example, when the user's finger is placed on the touchpad module and moved on the touchpad module, a cursor shown on a display screen of the notebook computer is correspondingly moved. Alternatively, the user may press down the touchpad module to have the notebook computer execute a specified function. In other words, the touchpad module can be used to replace the mouse. Since it is not necessary to additionally carry or install the mouse, the use of the touchpad module is convenient.

Generally, the touchpad module comprises a hinge structure, a triggering part and a touch member. The hinge structure is located at two opposite sides of an inner surface of a fixing frame in the notebook computer. The touch member is connected with the hinge structure. Consequently, the touch member can be swung relative to the triggering part by using the hinge structure as a fulcrum. As the touch member is swung, a switch element under the touch member pushes against the triggering part. Consequently, the switch element is triggered to generate a switch signal to the notebook computer. According to the switch signal, the notebook computer executes a corresponding function.

However, the conventional touchpad module still has some drawbacks. For example, the region of the touch member that is aligned with the hinge structure cannot be pressed down, but only the region of the touch member that is not aligned with the hinge structure can be pressed down. In other words, the touch member of the touchpad module can be locally pressed down. Due to the structural design of the touchpad module, it is unable to press down the whole surface of the touch member.

For solving the above drawbacks, a haptics trackpad module capable of performing the full area pressing action has been proposed. The haptics trackpad module comprises a force sensor. For example, the force sensor is a capacitive-type force sensor, a resistive-type force sensor or a strain gauge force sensor. The force sensor is used to detect the input action of the user. Moreover, in order to expand the interaction between the haptics trackpad module and the user, the internal portion of the haptics trackpad module is further equipped with a haptics feedback element. The haptics feedback element is used to allow a portion of the haptics trackpad module to vibrate. The feedback or interaction purpose is achieved when the user feels the vibration. In accordance with the existing technology, the haptics trackpad module is equipped with a piezoelectric vibration element to generate the vibration. Consequently, the haptics trackpad module has the haptics feedback function.

However, the structure of the conventional haptics trackpad module still has some drawbacks. For example, only a specified surface of the piezoelectric vibration element is attached on the touch member. Consequently, when the piezoelectric vibration element vibrates the touch member, only a reaction force from the touch member is applied to the piezoelectric vibration element. Under this circumstance, the acceleration of the vibration generated by the piezoelectric vibration element cannot be effectively increased, and thus the vibration tactile feel is usually unsatisfactory to the user.

Therefore, there is a need of providing an improved touchpad module in order to overcome the above drawbacks.

SUMMARY OF THE INVENTION

An object of the present invention provides a touchpad module. The structure of the touchpad module is specially designed. Consequently, the acceleration of the vibration generated by a piezoelectric vibration unit of the touchpad module is increased, and the operating feel to the user is enhanced.

Another object of the present invention provides a computing device with a touchpad module. The structure of the touchpad module is specially designed. Consequently, the acceleration of the vibration generated by a piezoelectric vibration unit of the touchpad module is increased, and the operating feel to the user is enhanced.

The other objects and advantages of the present invention will be understood from the disclosed technical features.

In accordance with an aspect of the present invention, a touchpad module for a computing device is provided. The touchpad module is installed within a fixing frame of a computing device. The touchpad module includes a touch member, a bracket, at least one piezoelectric vibration unit and at least one elastic element. The bracket is located under the touch member. The bracket includes at least one first perforation. A portion of the touch member is exposed to the at least one first perforation. The at least one piezoelectric vibration unit is aligned with the at least one first perforation of the bracket. Each of the at least one piezoelectric vibration unit has a first surface and a second surface, which are opposed to each other. The at least one elastic element installed on the bracket and contacted with the second surface of the at least one piezoelectric vibration unit. When the at least one piezoelectric vibration unit vibrates, a first reaction force is generated between the first surface of the at least one piezoelectric vibration unit and the portion of the touch member exposed to the at least one first perforation, and a second reaction force is generated between the second surface of the at least one piezoelectric vibration unit and the at least one elastic element.

In an embodiment, the touch member includes a covering plate and a circuit board. The circuit board is arranged between the covering plate and the bracket. A portion of the circuit board is exposed to the at least one first perforation of the bracket.

In an embodiment, the bracket further includes a second perforation, and the second perforation is located beside the at least one first perforation. The touchpad module further includes a flexible printed circuit board and an electric connector. A first end of the flexible printed circuit board is installed on the first surface of the at least one piezoelectric vibration unit. A second end of the flexible printed circuit board is connected with the electric connector. The electric connector is penetrated through the second perforation of the bracket and connected with the circuit board.

In an embodiment, each of the at least one piezoelectric vibration unit further includes a piezoelectric ceramic element and a carrier plate. A top surface of the piezoelectric ceramic element is the first surface of the piezoelectric vibration unit. A bottom surface of the carrier plate is the second surface of the piezoelectric vibration unit.

In an embodiment, the bracket further includes a first fixing part and a second fixing part. The first fixing part is protruded from a first side of an inner edge of the first perforation. The second fixing part is protruded from a second side of the inner edge of the first perforation. The first side and the second side are opposed to each other. The first fixing part and the second fixing part are connected with the at least one elastic element.

In an embodiment, each of the at least one elastic element includes a plate-type structure, a first connection part and a second connection part. The plate-type structure has a contact surface, wherein the contact surface is contacted with the second surface of the at least one piezoelectric vibration unit. The first connection part is connected between the plate-type structure and the first fixing part of the bracket. The second connection part is connected between the plate-type structure and the second fixing part of the bracket.

In an embodiment, the plate-type structure of the elastic element is extended in a first direction and located under the second surface of the at least one piezoelectric vibration unit. There is a gap between the plate-type structure and the first connection part or the second connection part in a second direction. The first direction and the second direction are perpendicular to each other.

In an embodiment, each of the at least one elastic element includes a first U-shaped sheet structure, a second U-shaped sheet structure, a first connection part and a second connection part. The first U-shaped sheet structure includes two first extension parts. The two first extension parts are contacted with a first side of the second surface of the piezoelectric vibration unit. The second U-shaped sheet structure includes two second extension parts. The two second extension parts are contacted with a second side of the second surface of the piezoelectric vibration unit. The second extension parts and the first extension parts are extended toward each other. The first connection part is connected between the first U-shaped sheet structure and the first fixing part of the bracket. The second connection part is connected between the second U-shaped sheet structure and the second fixing part of the bracket.

In an embodiment, there is a first angle between the first U-shaped sheet structure and the first connection part, and there is a second angle between the second U-shaped sheet structure and the second connection part. The first angle and the second angle are equal.

In an embodiment, the at least one first perforation of the bracket includes two first perforations, the at least one piezoelectric vibration unit includes two piezoelectric vibration units, and at least one elastic element includes two elastic elements. The two first perforations are respectively located at two lateral sides of the bracket. The two piezoelectric vibration units are respectively aligned with the corresponding first perforations. The two elastic elements are respectively contacted with the corresponding piezoelectric vibration units.

In accordance with another aspect of the present invention, a computing device is provided. The computing device includes a casing, a processor and a touchpad module. A fixing frame is concavely formed in the casing. The processor is disposed within the casing. The touchpad module is disposed within the casing and electrically connected with the processor. The touchpad module includes a touch member, a bracket, at least one piezoelectric vibration unit and at least one elastic element. The bracket is located under the touch member. The bracket includes at least one first perforation. A portion of the touch member is exposed to the at least one first perforation. The at least one piezoelectric vibration unit is aligned with the at least one first perforation of the bracket. Each of the at least one piezoelectric vibration unit has a first surface and a second surface, which are opposed to each other. The at least one elastic element installed on the bracket and contacted with the second surface of the at least one piezoelectric vibration unit. When the at least one piezoelectric vibration unit vibrates, a first reaction force is generated between the first surface of the at least one piezoelectric vibration unit and the portion of the touch member exposed to the at least one first perforation, and a second reaction force is generated between the second surface of the at least one piezoelectric vibration unit and the at least one elastic element.

From the above descriptions, the present invention provides the touchpad module. The elastic element is contacted with the second surface of the piezoelectric vibration unit. When the piezoelectric vibration unit vibrates upwardly and the first surface of the piezoelectric vibration unit knocks on the touch member, the touch member provides the first reaction force to feed back the piezoelectric vibration unit. Then, when the piezoelectric vibration unit vibrates downwardly and the second surface of the piezoelectric vibration unit knocks on the elastic element, the elastic element provides the second reaction force to feed back the piezoelectric vibration unit. Due to this structural design, the acceleration of the vibration generated by the piezoelectric vibration unit is increased. Consequently, the operating feel to the user is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
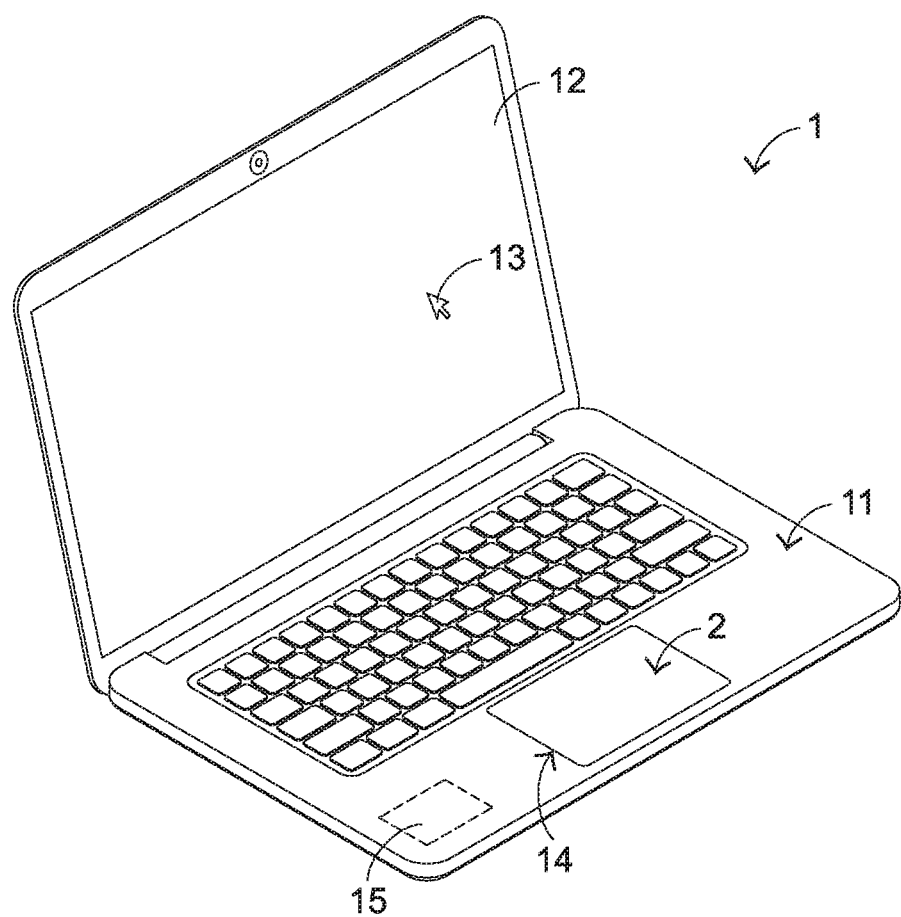
FIG. 1 is a schematic perspective view illustrating the outer appearance of a computing device with a touchpad module according to a first embodiment of the present invention.

FIG. 1 is a schematic perspective view illustrating the outer appearance of a computing device with a touchpad module according to a first embodiment of the present invention. An example of the computing device 1 includes but is not limited to a notebook computer. In an embodiment, the computing device 1 comprises a casing 11, a display screen 12, a processor 15 and a touchpad module 2. The processor 15 is disposed within the casing 11. The processor 15 is used for processing electronic signals of the computing device 1. Moreover, a fixing frame 14 is concavely formed in the casing 11. The touchpad module 2 is disposed within the fixing frame 14 and electrically connected with the processor 15. In addition, at least a portion of the touchpad module 2 is exposed outside so as to be touched by the user's finger. Consequently, the user can operate the touchpad module 2 to control the computing device 1. For example, in case that the user's finger is placed on the touchpad module 2 and slid on the touchpad module 2, a cursor 13 shown on the display screen 12 is correspondingly moved. Moreover, in case that the touchpad module 2 is pressed down by the user's finger, the computing device 1 executes a specified function. In an embodiment, the touchpad module 2 is a haptics trackpad. It is noted that the example of the touchpad module is not restricted.

The other structure of the touchpad module 2 will be described in more details as follows.

Figure 2:
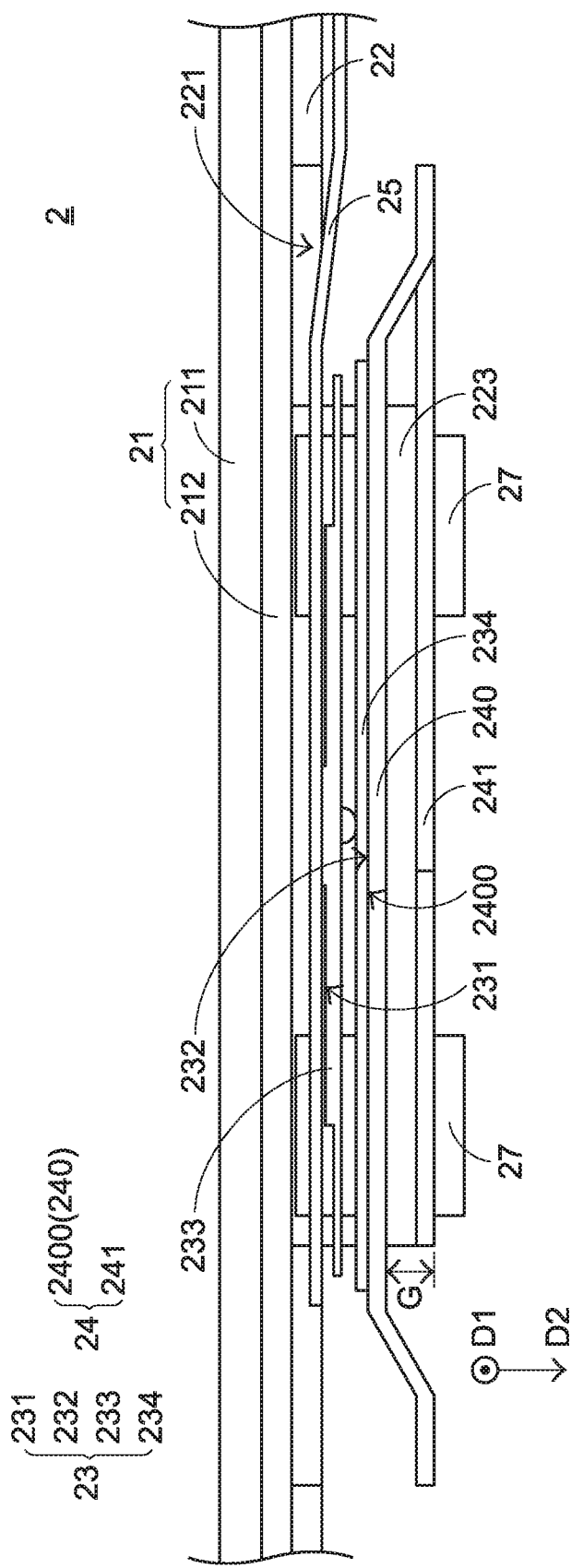
FIG. 2 is a schematic side view illustrating a portion of the touchpad module of the computing device as shown in FIG. 1 and taken along a viewpoint.
Figure 3:
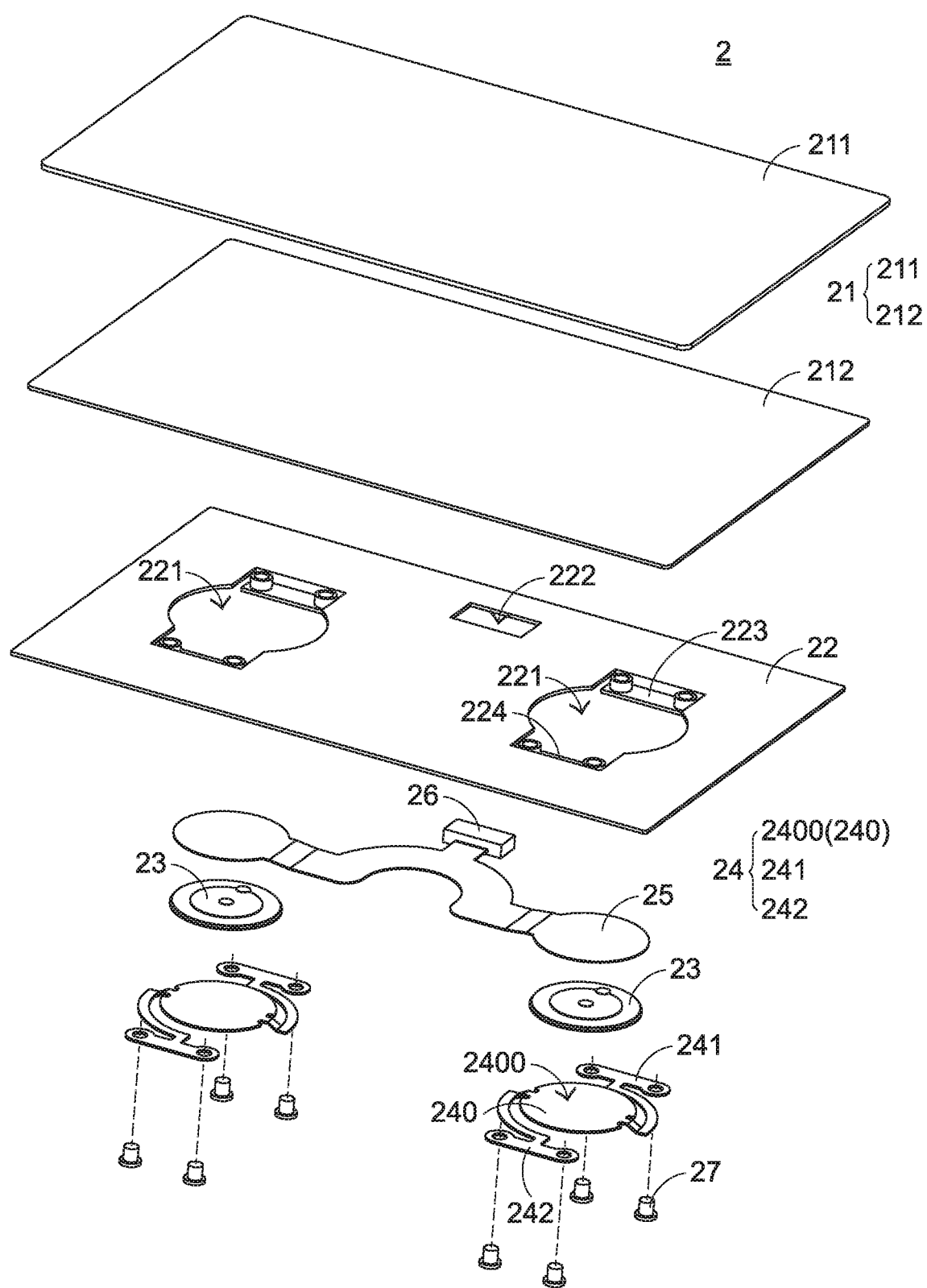
FIG. 3 is a schematic exploded view illustrating the touchpad module as shown in FIG. 2.
Figure 4:
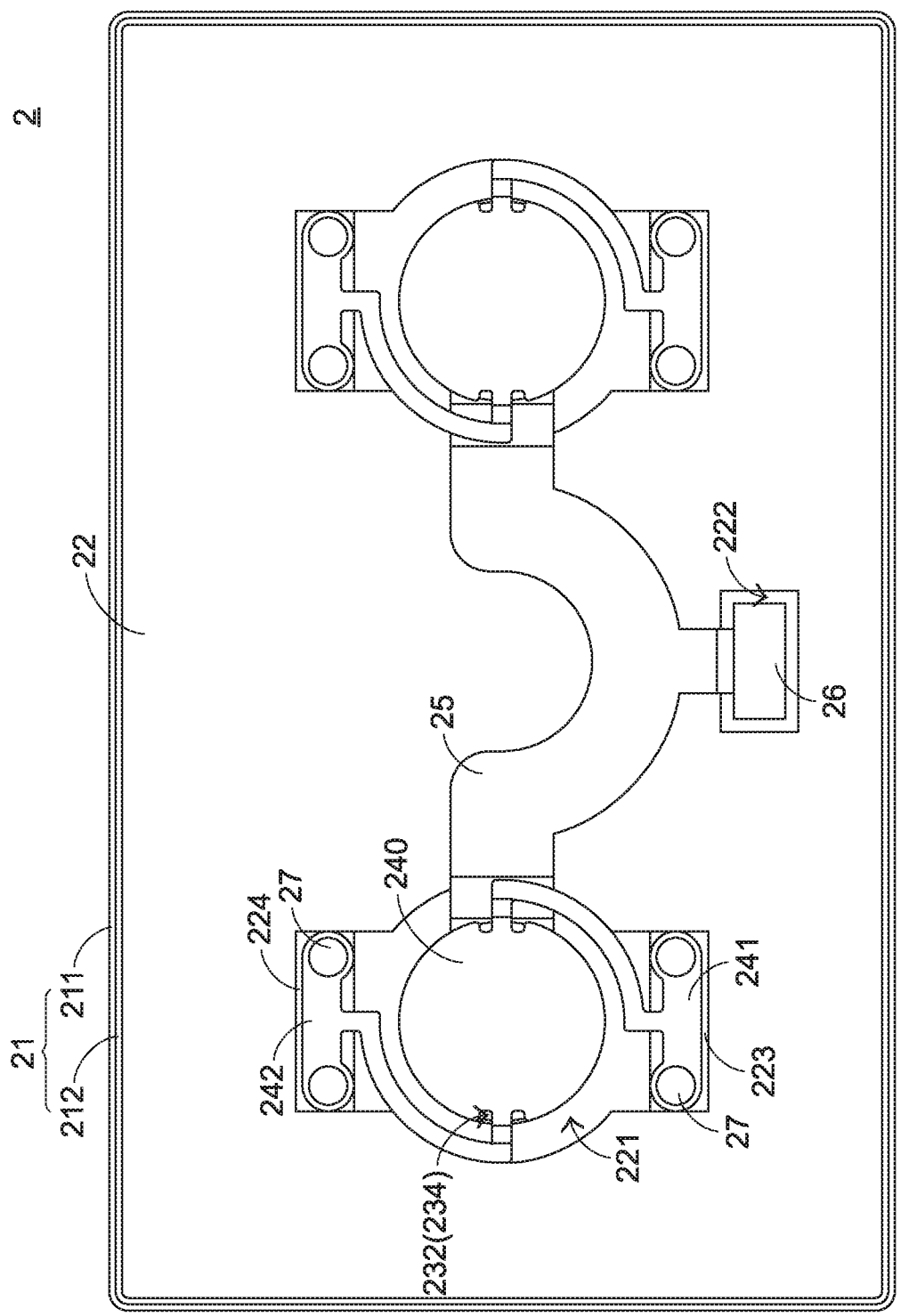
FIG. 4 is a schematic bottom view illustrating the touchpad module as shown in FIG. 2.
Figure 5:
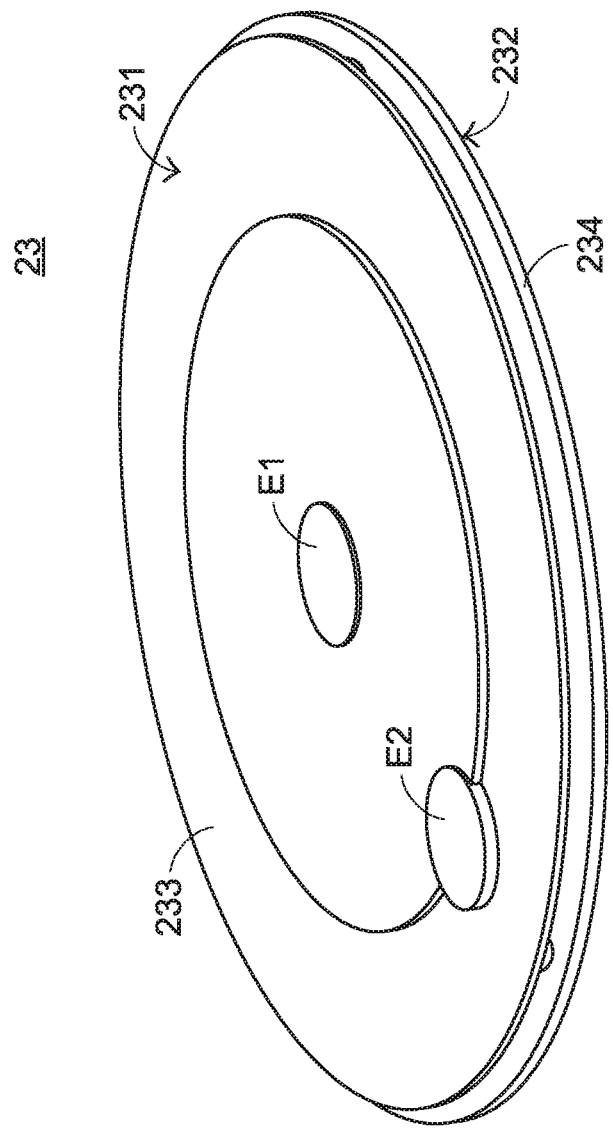
FIG. 5 is a schematic perspective view illustrating the appearance of a piezoelectric vibration unit of the touchpad module as shown in FIG. 2.

Please refer to FIGS. 2, 3 and 4. FIG. 2 is a schematic side view illustrating a portion of the touchpad module of the computing device as shown in FIG. 1 and taken along a viewpoint. FIG. 3 is a schematic exploded view illustrating the touchpad module as shown in FIG. 2. FIG. 4 is a schematic bottom view illustrating the touchpad module as shown in FIG. 2. FIG. 5 is a schematic perspective view illustrating the appearance of a piezoelectric vibration unit of the touchpad module as shown in FIG. 2.

As shown in FIGS. 2, 3 and 4, the touchpad module 2 comprises a touch member 21, a bracket 22, at least one piezoelectric vibration unit 23 and at least one elastic element 24. The bracket 22 is located under the touch member 21. The bracket 22 comprises at least one first perforation 221. After the touch member 21 and the bracket 22 are combined together, a portion of the touch member 21 is exposed to the first perforation 221 of the bracket 22. The at least one piezoelectric vibration unit 23 is installed according to the position of the at least one first perforation 221 of the bracket 22. Particularly, the piezoelectric vibration unit 23 is located under the corresponding first perforation 221 of the bracket 22. The piezoelectric vibration unit 23 has a first surface 231 and a second surface 232, which are opposed to each other. The first surface 231 of the piezoelectric vibration unit 23 faces the first perforation 221 of the bracket 22. The at least one elastic element 24 is installed on the bracket 22 and contacted with the second surface 232 of the corresponding piezoelectric vibration unit 23.

When the piezoelectric vibration unit 23 vibrates, a first reaction force is generated between the first surface 231 of the piezoelectric vibration unit 23 and the portion of the touch member 21 exposed to the first perforation 221. That is, when the piezoelectric vibration unit 23 vibrates upwardly and the first surface 231 of the piezoelectric vibration unit 23 knocks on the touch member 21, the touch member 21 provides the corresponding first reaction force to the piezoelectric vibration unit 23.

Similarly, a second reaction force is generated between the second surface 232 of the piezoelectric vibration unit 23 and the elastic element 24. That is, when the piezoelectric vibration unit 23 vibrates downwardly and the second surface 232 of the piezoelectric vibration unit 23 knocks on the elastic element 24, the elastic element 24 provides the corresponding second reaction force to the piezoelectric vibration unit 23. Due to this structural design, the acceleration of the vibration generated by the piezoelectric vibration unit 23 is increased. Consequently, the operating feel to the user is enhanced.

In an embodiment, the at least one first perforation 221 in the bracket 22 includes two first perforations 221, the at least one piezoelectric vibration unit 23 includes two piezoelectric vibration units 23, and the at least one elastic element 24 includes two elastic elements 24. The two first perforations 221 are located at two lateral sides of the bracket 22. The two piezoelectric vibration units 23 are aligned with the corresponding first perforations 221, respectively. The two elastic elements 24 are contacted with the second surfaces 232 of the corresponding piezoelectric vibration units 23. It is noted that the numbers of these components are not restricted. That is, the numbers of these components may be increased or decreased according to the practical requirements.

Please refer to FIGS. 2, 3 and 4 again. In an embodiment, the touch member 21 comprises a covering plate 211 and a circuit board 212. The covering plate 211 is located over the circuit board 212. The circuit board 212 is arranged between the covering plate 211 and the bracket 22. Moreover, portions of the circuit board 212 are exposed to the first perforations 221 of the bracket 22. Preferably but not exclusively, the covering plate 211 is made of glass or any other appropriate material. The material of the covering plate 211 may be varied according to the practical requirements.

Please refer to FIGS. 2, 3 and 4 again. In an embodiment, the bracket 22 further comprises a second perforation 222. The second perforation 222 is arranged between the two first perforations 221. Moreover, the touchpad module 2 further comprises a flexible printed circuit board 25 and an electric connector 26. A first end of the flexible printed circuit board 25 is installed on the first surface 231 of the piezoelectric vibration unit 23. A second end of the flexible printed circuit board 25 is connected with the electric connector 26. The electric connector 26 is penetrated through the second perforation 222 of the bracket 22 and connected with the circuit board 212. In this embodiment, the piezoelectric vibration unit 23 is electrically connected with the circuit board 212 through the flexible printed circuit board 25 and the electric connector 26. Consequently, the piezoelectric vibration unit 23 is electrically connected with a processing unit (not shown) and a power supply unit (not shown) on the circuit board 212. The processing unit is used to detect the electric energy that is generated by the piezoelectric vibration unit 23 in response to a direct piezoelectric effect. The power supply unit is used to provide an AC voltage to the piezoelectric vibration unit 23, and thus the piezoelectric vibration unit 23 generates an inverse piezoelectric effect.

As shown in FIG. 5, the piezoelectric vibration unit 23 comprises a piezoelectric ceramic element 233 and a carrier plate 234. The piezoelectric ceramic element 233 is attached on the carrier plate 234. The top surface of the piezoelectric ceramic element 233 is the first surface 231 of the piezoelectric vibration unit 23. The bottom surface of the carrier plate 234 is the second surface 232 of the piezoelectric vibration unit 23. In an embodiment, the piezoelectric vibration unit 23 further comprises a first electrode E1 and a second electrode E2, which are installed on the first surface 231 of the piezoelectric vibration unit 23. The first end of the flexible printed circuit board 25 is contacted with the first electrode E1 and the second electrode E2. When the piezoelectric vibration unit 23 receives the electric energy through the first electrode E1 and the second electrode E2, the piezoelectric vibration unit 23 is subjected to a tensile deformation (i.e., upward movement) and a compressive deformation (i.e., downward movement) in response to the inverse piezoelectric effect. Since the AC voltage is alternately switched between a positive polarity and a negative polarity, the piezoelectric vibration unit 23 can undergo the tensile deformation and the compressive deformation. In other words, the piezoelectric vibration unit 23 can be bent in different directions. Preferably but not exclusively, the area of the piezoelectric ceramic element 233 is smaller than the area of the carrier plate 234, and the piezoelectric ceramic element 233 and the carrier plate 234 are bonded together through silver paste (not shown).

Please refer to FIGS. 2, 3 and 4 again. In an embodiment, the bracket 22 further comprises a first fixing part 223 and a second fixing part 224. The first fixing part 223 is protruded from a first side of an inner edge of the first perforation 221. The second fixing part 224 is protruded from a second side of the inner edge of the first perforation 221, wherein the first side and the second side are opposed to each other. The first fixing part 223 and the second fixing part 224 are respectively connected with a first side and a second side of the elastic element 24. Consequently, the elastic element 24 is fixed on the bracket 22.

Please refer to FIGS. 2, 3 and 4 again. In an embodiment, the elastic element 24 comprises a plate-type structure 240, a first connection part 241 and a second connection part 242. The plate-type structure 240 has a contact surface 2400. The contact surface 2400 of the plate-type structure 240 is contacted with the second surface 232 of the piezoelectric vibration unit 23. That is, the contact surface 2400 of the plate-type structure 240 is contacted with the carrier plate 234 of the piezoelectric vibration unit 23. The first connection part 241 is connected between the plate-type structure 240 and the first fixing part 223 of the bracket 22. The second connection part 242 is connected between the plate-type structure 240 and the second fixing part 224 of the bracket 22. The touchpad module 2 further comprises plural fastening elements 27. The first connection part 241 and the second connection part 242 of the elastic element 24 are respectively fastened on the first fixing part 223 and the second fixing part 224 of the bracket 22 through these fastening elements 27.

Please refer to FIG. 2 again. In an embodiment, the plate-type structure 240 of the elastic element 24 is extended in a first direction D1, and the plate-type structure 240 of the elastic element 24 is located under and contacted with the second surface 232 of the piezoelectric vibration unit 23. There is a gap G between the plate-type structure 240 and the first connection part 241 (or the second connection part 242) in a second direction D2. The first direction D1 and the second direction D2 are perpendicular to each other. The plate-type structure 240 can be moved upwardly or downwardly relative to the first connection part 241 and the second connection part 242 (i.e., fulcrums) and within the range of the gap G.

While the piezoelectric vibration unit 23 vibrates to result in the downward movement, the second surface 232 of the piezoelectric vibration unit 23 knocks on the contact surface 2400 of the plate-type structure 240. Consequently, the plate-type structure 240 is moved downwardly relative to the first connection part 241 and the second connection part 242 (i.e., fulcrums). Moreover, the plate-type structure 240 is moved upwardly in response to an elastic restoring force. During the upward moving process of the plate-type structure 240, the second reaction force is transmitted to the piezoelectric vibration unit 23.

Figure 6:
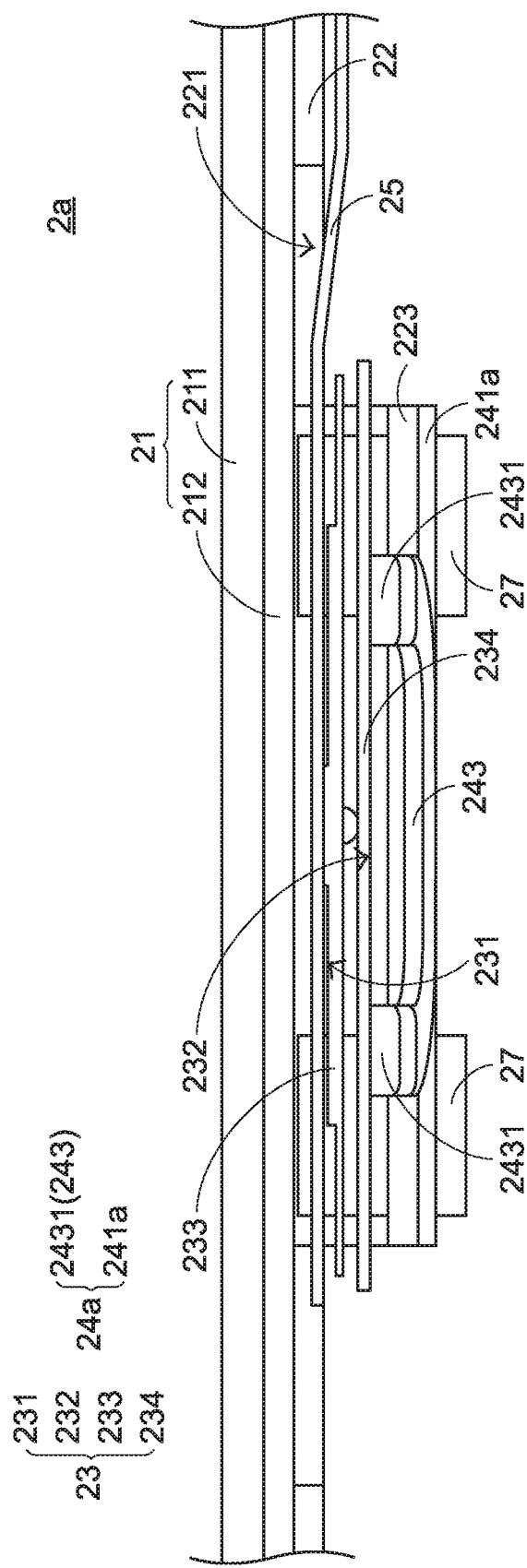
FIG. 6 is a schematic side view illustrating a touchpad module according to a second embodiment of the present invention and taken along a viewpoint.
Figure 7:
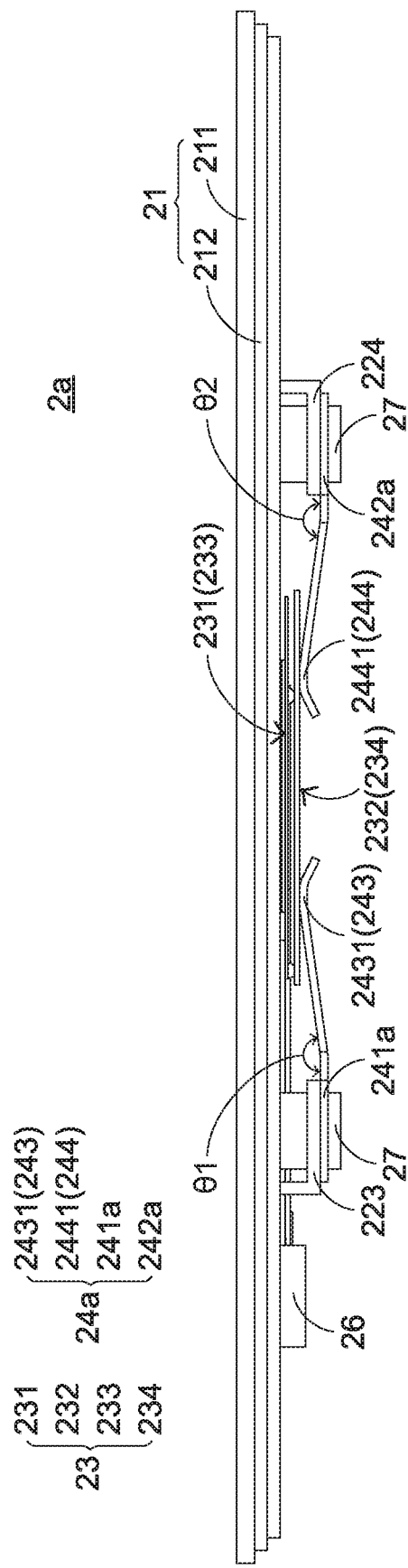
FIG. 7 is a schematic side view illustrating the touchpad module as shown in FIG. 6 and taken along another viewpoint.
Figure 8:
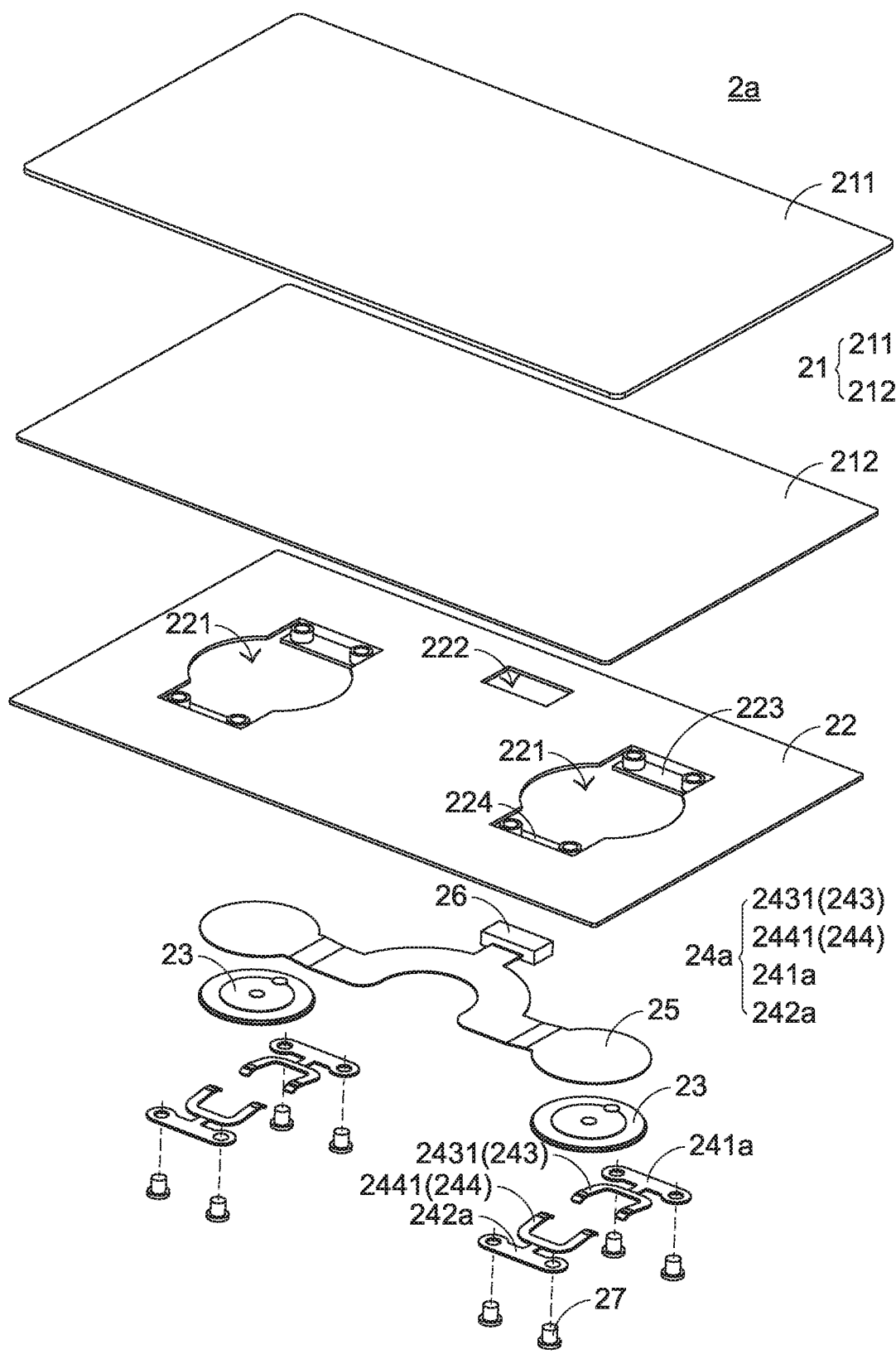
FIG. 8 is a schematic exploded view illustrating the touchpad module as shown in FIG. 6.
Figure 9:
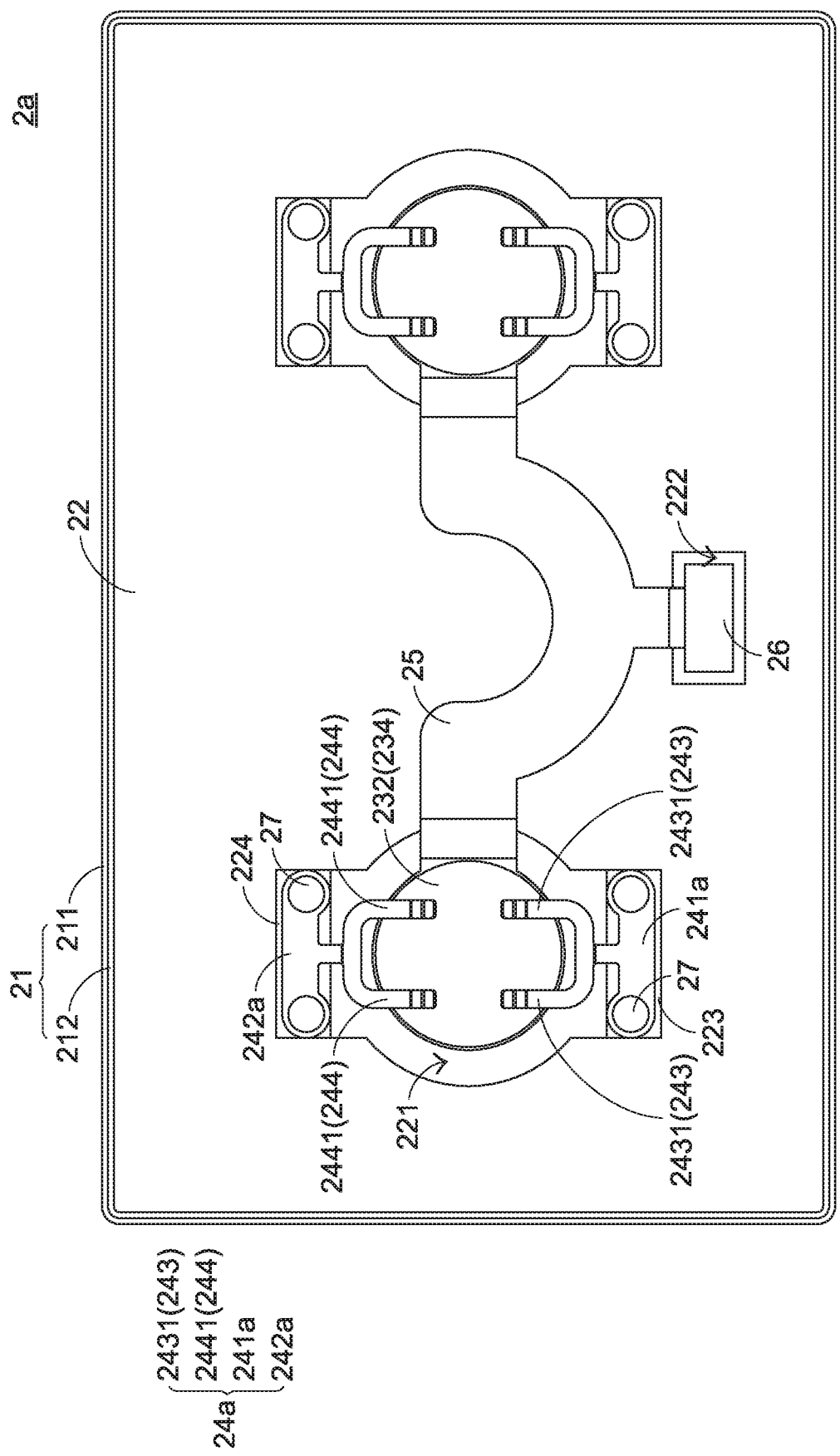
FIG. 9 is a schematic bottom view illustrating the touchpad module as shown in FIG. 6.

Please refer to FIGS. 6, 7, 8 and 9. FIG. 6 is a schematic side view illustrating a touchpad module according to a second embodiment of the present invention and taken along a viewpoint. FIG. 7 is a schematic side view illustrating the touchpad module as shown in FIG. 6 and taken along another viewpoint. FIG. 8 is a schematic exploded view illustrating the touchpad module as shown in FIG. 6. FIG. 9 is a schematic bottom view illustrating the touchpad module as shown in FIG. 6.

In comparison with the touchpad module 2 as shown in FIGS. 2, 3 and 4, the structure of the elastic element 24a in the touchpad module 2a of this embodiment is distinguished. In this embodiment, the elastic element 24a comprises a first U-shaped sheet structure 243, a second U-shaped sheet structure 244, a first connection part 241a and a second connection part 242a. The first U-shaped sheet structure 243 comprises two first extension parts 2431. The two first extension parts 2431 are contacted with a first side of the second surface 232 of the piezoelectric vibration unit 23. That is, the two first extension parts 2431 are contacted with a first side of the carrier plate 234 of the piezoelectric vibration unit 23. The second U-shaped sheet structure 244 comprises two second extension parts 2441. The two second extension parts 2441 are contacted with a second side of the second surface 232 of the piezoelectric vibration unit 23. That is, the two second extension parts 2441 are contacted with a second side of the carrier plate 234 of the piezoelectric vibration unit 23. In addition, the second extension parts 2441 and the first extension parts 2431 are extended in the directions toward each other. The first connection part 241a is connected between the first U-shaped sheet structure 243 and the first fixing part 223 of the bracket 22. The second connection part 242a is connected between the second U-shaped sheet structure 244 and the second fixing part 224 of the bracket 22.

As shown in FIG. 7, there is a first angle θ1 between the first U-shaped sheet structure 243 and the first connection part 241a, and there is a second angle θ2 between the second U-shaped sheet structure 244 and the second connection part 242a. In this embodiment, the first angle θ1 and the second angle θ2 are equal. That is, the first extension parts 2431 of the first U-shaped sheet structure 243 are extended in the direction away from the first connection part 241a and gradually inclined in the direction toward the piezoelectric vibration unit 23. Similarly, the second extension parts 2441 of the second U-shaped sheet structure 244 are extended in the direction away from the second connection part 242a and gradually inclined in the direction toward the piezoelectric vibration unit 23. Consequently, the first extension parts 2431 and the second extension parts 2441 can be swung upwardly or downwardly relative to the first connection part 241*a* and the second connection part 242*a* (i.e., fulcrums), respectively.

While the piezoelectric vibration unit 23 vibrates to result in the downward movement, the second surface 232 of the piezoelectric vibration unit 23 knocks on the first extension parts 2431 of the first U-shaped sheet structure 243 and the second extension parts 2441 of the second U-shaped sheet structure 244. Consequently, the first extension parts 2431 and the second extension parts 244 are swung downwardly relative to the first connection part 241*a* and the second connection part 242*a* (i.e., fulcrums), respectively. Moreover, the first extension parts 2431 and the second extension parts 244 are moved upwardly in response to an elastic restoring force. During the upward swinging processes of the first extension parts 2431 and the second extension parts 244, the second reaction force is transmitted from 40 to the piezoelectric vibration unit 23.

The connecting relationships between the other components of the touchpad module 2*a* of this embodiment are similar to those of the touchpad module 2 as shown in FIGS. 2, 3 and 4, and not redundantly described herein.

From the above descriptions, the present invention provides the touchpad module. The elastic element is contacted with the second surface of the piezoelectric vibration unit. When the piezoelectric vibration unit vibrates upwardly and the first surface of the piezoelectric vibration unit knocks on the touch member, the touch member provides the first reaction force to feed back the piezoelectric vibration unit. Then, when the piezoelectric vibration unit vibrates downwardly and the second surface of the piezoelectric vibration unit knocks on the elastic element, the elastic element provides the second reaction force to feed back the piezoelectric vibration unit. Due to this structural design, the acceleration of the vibration generated by the piezoelectric vibration unit is increased. Consequently, the operating feel to the user is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of a computing device, the touchpad module comprising:
    a touch member, wherein the touch member comprises a covering plate and a circuit board;
    a bracket located under the touch member, wherein the bracket comprises at least one first perforation, and a portion of the touch member is exposed to the at least one first perforation, wherein the circuit board is arranged between the covering plate and the bracket, and a portion of the circuit board is exposed to the at least one first perforation of the bracket, wherein the bracket further comprises a second perforation, and the second perforation is located beside the at least one first perforation;
    at least one piezoelectric vibration unit aligned with the at least one first perforation of the bracket, wherein each of the at least one piezoelectric vibration unit has a first surface and a second surface, which are opposed to each other; and
    at least one elastic element installed on the bracket and contacted with the second surface of the at least one piezoelectric vibration unit,
    wherein when the at least one piezoelectric vibration unit vibrates, a first reaction force is generated between the first surface of the at least one piezoelectric vibration unit and the portion of the touch member exposed to the at least one first perforation, and a second reaction force is generated between the second surface of the at least one piezoelectric vibration unit and the at least one elastic element,
    wherein the touchpad module further comprises a flexible printed circuit board and electric connector, wherein a first end of the flexible printed circuit board is installed on the first surface of the at least one piezoelectric vibration unit, a second end of the flexible printed circuit board is connected with the electric connector, and the electric connector is penetrated through the second perforation of the bracket and connected with the circuit board.

2. The touchpad module according to claim 1, wherein each of the at least one piezoelectric vibration unit further comprises a piezoelectric ceramic element and a carrier plate, wherein a top surface of the piezoelectric ceramic element is the first surface of the piezoelectric vibration unit, and a bottom surface of the carrier plate is the second surface of the piezoelectric vibration unit.

3. The touchpad module according to claim 1, wherein the bracket further comprises a first fixing part and a second fixing part, wherein the first fixing part is protruded from a first side of an inner edge of the first perforation, the second fixing part is protruded from a second side of the inner edge of the first perforation, and the first side and the second side are opposed to each other, wherein the first fixing part and the second fixing part are connected with the at least one elastic element.

4. The touchpad module according to claim 3, wherein each of the at least one elastic element comprises:
    a plate-type structure having a contact surface, wherein the contact surface is contacted with the second surface of the at least one piezoelectric vibration unit;
    a first connection part connected between the plate-type structure and the first fixing part of the bracket; and
    a second connection part connected between the plate-type structure and the second fixing part of the bracket.

5. The touchpad module according to claim 4, wherein the plate-type structure of the elastic element is extended in a first direction and located under the second surface of the at least one piezoelectric vibration unit, and there is a gap between the plate-type structure and the first connection part or the second connection part in a second direction, wherein the first direction and the second direction are perpendicular to each other.

6. The touchpad module according to claim 3, wherein each of the at least one elastic element comprises:
    a first U-shaped sheet structure comprising two first extension parts, wherein the two first extension parts are contacted with a first side of the second surface of the piezoelectric vibration unit;
    a second U-shaped sheet structure comprising two second extension parts, wherein the two second extension parts are contacted with a second side of the second surface of the piezoelectric vibration unit, wherein the second extension parts and the first extension parts are extended toward each other;
a first connection part connected between the first U-shaped sheet structure and the first fixing part of the bracket; and
a second connection part connected between the second U-shaped sheet structure and the second fixing part of the bracket.

7. The touchpad module according to claim 6, wherein there is a first angle between the first U-shaped sheet structure and the first connection part, and there is a second angle between the second U-shaped sheet structure and the second connection part, wherein the first angle and the second angle are equal.

8. The touchpad module according to claim 1, wherein the at least one first perforation of the bracket includes two first perforations, the at least one piezoelectric vibration unit includes two piezoelectric vibration units, and at least one elastic element includes two elastic elements, wherein the two first perforations are respectively located at two lateral sides of the bracket, the two piezoelectric vibration units are respectively aligned with the corresponding first perforations, and the two elastic elements are respectively contacted with the corresponding piezoelectric vibration units.

9. A computing device, comprising:
a casing, wherein a fixing frame is concavely formed in the casing;
a processor disposed within the casing; and
a touchpad module disposed within the casing and electrically connected with the processor, wherein the touchpad module comprises:
a touch member;
a bracket located under the touch member, wherein the bracket comprises at least one first perforation, and a portion of the touch member is exposed to the at least one first perforation;
at least one piezoelectric vibration unit aligned with the at least one first perforation of the bracket, wherein each of the at least one piezoelectric vibration unit has a first surface and a second surface, which are opposed to each other; and
at least one elastic element installed on the bracket and contacted with the second surface of the at least one piezoelectric vibration unit,
wherein when the at least one piezoelectric vibration unit vibrates, a first reaction force is generated between the first surface of the at least one piezoelectric vibration unit and the portion of the touch member exposed to the at least one first perforation, and a second reaction force is generated between the second surface of the at least one piezoelectric vibration unit and the at least one elastic element,
wherein the bracket further comprises a first fixing part and a second fixing part, wherein the first fixing part is protruded from a first side of an inner edge of the first peroration, the second fixing part is protruded from a second side of the inner edge of the first peroration, and the first side and the second side are opposed to each other, wherein the first fixing part and the second fixing part are connected with the at least one elastic element.

10. A touchpad module for a computing device, the touchpad module being installed within a fixing frame of a computing device, the touchpad module comprising:
a touch member;
a bracket located under the touch member, wherein the bracket comprises at least one first perforation, and a portion of the touch member is exposed to the at least one first perforation;
at least one piezoelectric vibration unit aligned with the at least one first perforation of the bracket, wherein each of the at least one piezoelectric vibration unit has a first surface and a second surface, which are opposed to each other; and
at least one elastic element installed on the bracket and contacted with the second surface of the at least one piezoelectric vibration unit,
wherein when the at least one piezoelectric vibration unit vibrates, a first reaction force is generated between the first surface of the at least one piezoelectric vibration unit and the portion of the touch member exposed to the at least one first perforation, and a second reaction force is generated between the second surface of the at least one piezoelectric vibration unit and the at least one elastic element,
wherein the bracket further comprises a first fixing part and a second fixing part, wherein the first fixing part is protruded from a first side of an inner edge of the first perforation, the second fixing part is protruded from a second side of the inner edge of the first perforation, and the first side and the second side are opposed to each other, wherein the first fixing part and the second fixing part are connected with the at least one elastic element.

11. The touchpad module according to claim 10, wherein each of the at least one elastic element comprises:
a plate-type structure having a contact surface, wherein the contact surface is contacted with the second surface of the at least one piezoelectric vibration unit;
a first connection part connected between the plate-type structure and the first fixing part of the bracket; and
a second connection part connected between the plate-type structure and the second fixing part of the bracket.

12. The touchpad module according to claim 11, wherein the plate-type structure of the elastic element is extended in a first direction and located under the second surface of the at least one piezoelectric vibration unit, and there is a gap between the plate-type structure and the first connection part or the second connection part in a second direction, wherein the first direction and the second direction are perpendicular to each other.

13. The touchpad module according to claim 10, wherein each of the at least one elastic element comprises:
a first U-shaped sheet structure comprising two first extension parts, wherein the two first extension parts are contacted with a first side of the second surface of the piezoelectric vibration unit;
a second U-shaped sheet structure comprising two second extension parts, wherein the two second extension parts are contacted with a second side of the second surface of the piezoelectric vibration unit, wherein the second extension parts and the first extension parts are extended toward each other;
a first connection part connected between the first U-shaped sheet structure and the first fixing part of the bracket; and
a second connection part connected between the second U-shaped sheet structure and the second fixing part of the bracket.

14. The touchpad module according to claim 13, wherein there is a first angle between the first U-shaped sheet structure and the first connection part, and there is a second angle between the second U-shaped sheet structure and the second connection part, wherein the first angle and the second angle are equal.

* * * * *